(12) United States Patent
Lee et al.

(10) Patent No.: US 9,407,871 B2
(45) Date of Patent: Aug. 2, 2016

(54) APPARATUS AND METHOD FOR CONTROLLING EYE-TO-EYE CONTACT FUNCTION

(71) Applicant: Electronics and Telecommunications Research Institute, Daejeon (KR)

(72) Inventors: Mi Suk Lee, Daejeon (KR); In Ki Hwang, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/625,962

(22) Filed: Feb. 19, 2015

(65) Prior Publication Data

US 2015/0278989 A1    Oct. 1, 2015

(30) Foreign Application Priority Data

Aug. 14, 2014    (KR) .......................... 10-2014-0106160

(51) Int. Cl.
| | | |
|---|---|---|
| *G06K 9/32* | (2006.01) | |
| *H04N 7/14* | (2006.01) | |
| *H04N 7/15* | (2006.01) | |
| *G06F 3/01* | (2006.01) | |
| *G06T 3/00* | (2006.01) | |
| *G06K 9/00* | (2006.01) | |

(52) U.S. Cl.
CPC .................. *H04N 7/15* (2013.01); *G06F 3/013* (2013.01); *G06F 3/017* (2013.01); *G06K 9/00597* (2013.01); *G06T 3/0093* (2013.01); *H04N 7/147* (2013.01); *G06K 9/00335* (2013.01); *H04N 7/144* (2013.01)

(58) Field of Classification Search
CPC ......... H04N 7/144; H04N 7/15; H04N 7/147; G06K 9/00597; G06K 9/00335; G06F 3/013; G06F 3/017; G06T 3/0093
USPC ............................... 382/293; 348/14.08, 14.1
See application file for complete search history.

(56) References Cited

U.S. PATENT DOCUMENTS

| | | | | | |
|---|---|---|---|---|---|
| 7,126,627 | B1 * | 10/2006 | Lewis | .................... | H04N 7/144 348/14.08 |
| 7,209,160 | B2 * | 4/2007 | McNelley | .............. | H04N 7/144 348/14.08 |
| 8,427,523 | B2 * | 4/2013 | Harrell | .................... | H04N 7/144 348/14.08 |
| 8,908,008 | B2 * | 12/2014 | Tan | .............................. | 348/14.01 |
| 8,976,224 | B2 * | 3/2015 | Smith | .................... | H04N 7/157 348/14.09 |
| 9,141,875 | B2 * | 9/2015 | Wolf | ....................... | H04N 7/144 |
| 2012/0274736 | A1 * | 11/2012 | Robinson | ................. | H04N 7/15 348/14.16 |

FOREIGN PATENT DOCUMENTS

| | | | |
|---|---|---|---|
| KR | 1020010032883 A | 4/2001 | |
| KR | 1020010064876 A | 7/2001 | |

* cited by examiner

*Primary Examiner* — Kanjibhai Patel
(74) *Attorney, Agent, or Firm* — William Park & Associates Ltd.

(57) ABSTRACT

Disclosed are an apparatus and a method of controlling an eye-to-eye contact function, which provide a natural eye-to-eye contact by controlling an eye-to-eye contact function based on gaze information about a local participant and position information about a remote participant on a screen when providing the eye-to-eye contact function by using an image combination method and the like in a teleconference system, thereby improving absorption to a teleconference.

14 Claims, 4 Drawing Sheets

FIG. 4

APPARATUS AND METHOD FOR CONTROLLING EYE-TO-EYE CONTACT FUNCTION

CROSS-REFERENCE TO RELATED APPLICATIONS

This application claims priority to and the benefit of Korean Patent Application No. 10-2014-0037785 filed in the Korean Intellectual Property Office on Mar. 31, 2014 and Korean Patent Application No. 10-2014-0106160 filed in the Korean Intellectual Property Office on Aug. 14, 2014, the entire contents of which are incorporated herein by reference.

TECHNICAL FIELD

The present invention relates to an apparatus and a method for controlling eye-to-eye contact for teleconference(or telepresence), and more particularly, to an apparatus and a method for controlling an eye-to-eye contact function, which provide natural eye-to-eye contact between remote participants during teleconference.

BACKGROUND ART

In general, eye-to-eye contact in a conversation between people is an important factor for enabling one person to recognize how much other people are concentrating on his/her talk. The eye-to-eye contact is a tacit language for enabling a person to be aware of a response and emotion, which are not said, by another person, and there is a research result that reliability and a sense of closeness to a person having an eye-to-eye contact are increased. Accordingly, eye-to-eye contact between remote participants in a conference using the teleconference system has attracted attention as one of a core technique of improving participation in the conference.

Figure 1:
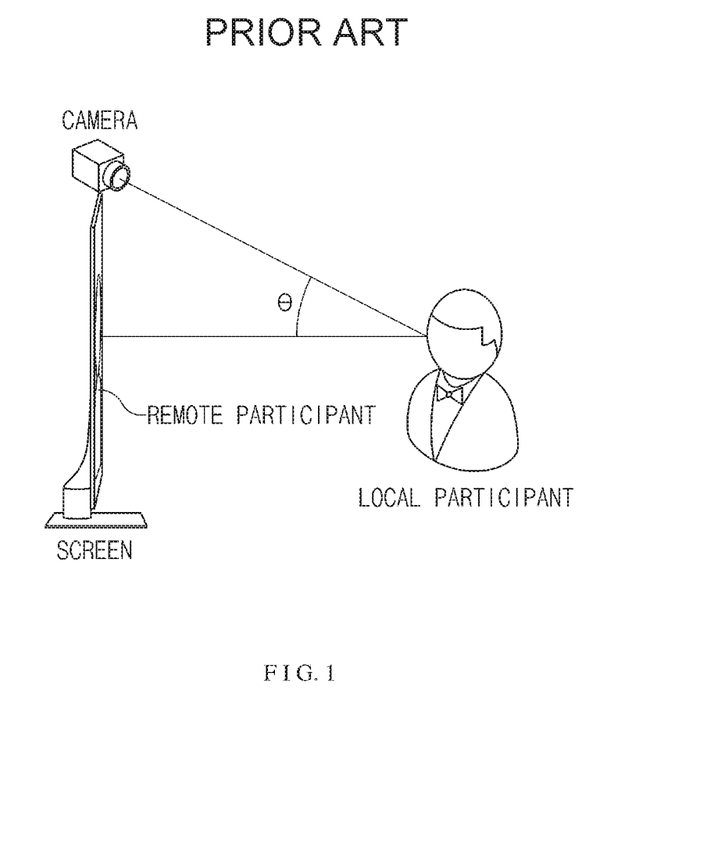
FIG. 1 is a diagram for describing a position of a camera in a general teleconference system.

In general, in the teleconference system, a camera is installed and operated on a screen (or a monitor) as illustrated in FIG. 1. Accordingly, even though a local participant looks at a face of a remote participant shown on the screen, the camera is located on the screen, so that the eyes of the local participant look downwardly in an image obtained by the camera, which is shown to the remote participant, by an angle difference θ generated for the local participant looking at the screen. Accordingly, even though the local participant actually looks at the eyes (or the face) of the remote participant shown on the screen, but the remote participant feels that the local participant is looking downwardly, not at his/her eyes (or the face). By contrast, when the camera is located at a lower side of the screen, the eyes of the local participant look upwardly in the image obtained by the camera even though the local participant looks at the remote participant shown on the screen.

In order to solve the problem, many organizations have conducted research on eye-to-eye contact technology. The eye-to-eye contact technology for the teleconference system is generally divided into two methods, that is, a physical method and an image combination method, and research thereof has been conducted.

The physical method means technology for providing an eye-to-eye contact image by adjusting a position of a camera. In general, an image is obtained by positioning a camera at a center on a back side of a semi-transmissive screen or adjusting a position of the camera to an eye-level of a local participant as close as possible to provide eye-to-eye contact. In the physical method, the former case requires installation of a separate system, and the latter case has a problem in that the eyes of a local participant may be hidden.

The image combination method means technology for combining eye-to-eye contact images by using images obtained by one or more cameras. A representative method is a method of pre-storing an image for eye-to-eye contact and replacing only an eye part with the eye-to-eye contact image in an image obtained by a camera, or combining 3-dimensional images by an image processing method, such as stereo matching, converting an eye point into a front side to provide eye-to-eye contact. In this method, it is very important to naturally combine eye-to-eye contact images in real time. Further, in applying the eye-to-eye contact technology, when a local participant looks at another point, not the eyes (or a face) of a remote participant, and an eye-to-eye contact is applied, very unnatural images are combined.

SUMMARY OF THE INVENTION

The present invention has been made in an effort to provide an apparatus and a method of controlling an eye-to-eye contact function, which provide a natural eye-to-eye contact by controlling an eye-to-eye contact function by using gaze information about a local participant and position information about a remote participant on a screen when providing the eye-to-eye contact function using an image combination method and the like in a teleconference system, thereby improving absorption to a teleconference.

An exemplary embodiment of the present invention provides a method of controlling a teleconference for controlling an eye-to-eye contact function of a teleconference system, including: generating gaze information about a local participant from an image obtained by a camera in real time; generating position information about eyes or a face of a remote participant displayed on a screen of a display device for a teleconference from telepresence data received from a teleconference system of the remote participant through a network in real time; and determining whether to apply an eye-to-eye contact function to the image obtained by the camera by using the gaze information about the local participant and the position information about the eyes or the face of the remote participant.

The method may further include adjusting the image obtained by the camera so that the eyes of the local participant in the image obtained by the camera look at the eyes or the face of the remote participant according to the determining whether to apply the eye-to-eye contact function.

The method may further include transmitting telepresence data including the adjusted image generated through the adjustment of the image to the teleconference system of the remote participant.

The generating of the gaze information about the local participant may include generating information indicating whether the eyes of the local participant face a remote participant display area on the screen of the display device as the gaze information.

The generating of the gaze information about the local participant may include generating information indicating a direction of a remote participant display region or a direction among up, down, left, and right directions of the remote participant display region in which the eyes of the local participant face on the screen of the display device, or the information about an actual eye direction of the local participant as the gaze information.

The generating of the position information about the eyes or the face of the remote participant may include generating coordinates relative to the camera or a predetermined reference point as the position information about the eyes or the face of the remote participant.

The generating of the position information about the eyes or the face of the remote participant may include generating a predetermined code as the position information about the eyes or the face of the remote participant when the eyes or the face of the remote participant is not included in the image on the screen of the display device.

The determining whether to apply the eye-to-eye contact function may include determining to apply the eye-to-eye contact function when the local participant looks in a direction of a remote participant display region on the screen of the display device according to the gaze information about the local participant, and the eyes of the remote participant face a front side according to the position information about the eyes or the face of the remote participant.

The determining whether to apply the eye-to-eye contact function may include determining not to apply the eye-to-eye contact function when the eyes of the remote participant do not face a front side according to the position information about the eyes or the face of the remote participant or the eyes or the face of the remote participant is not included in the image on the screen of the display device.

Another exemplary embodiment of the present invention provides an apparatus for controlling a teleconference for controlling an eye-to-eye contact function of a teleconference system, including: an eye tracing unit configured to generate gaze information about a local participant from an image obtained by a camera in real time; a face position tracing unit configured to generate position information about eyes or a face of a remote participant displayed on a screen of a display device for a teleconference from a telepresence data received from a teleconference system of the remote participant through a network in real time; and a determining unit configured to determine whether to apply an eye-to-eye contact function to the image obtained by the camera by using the gaze information about the local participant and the position information about the eyes or the face of the remote participant.

The apparatus may further include an image adjusting unit configured to adjust the image obtained by the camera so that the eyes of the local participant in the image obtained by the camera look at the eyes or the face of the remote participant according to the determination of the determining unit.

The apparatus may further include a transmitting unit configured to transmit telepresence data including the image adjusted and generated by the image adjusting unit to the teleconference system of the remote participant.

The eye tracing unit may generate information indicating whether the eyes of the local participant look at a remote participant display area on the screen of the display device as the gaze information.

The eye tracing unit may generate information indicating a direction of a remote participant display region or a direction among up, down, left, and right directions of the remote participant display region in which the eyes of the local participant face on the screen of the display device, or the information about an actual eye direction of the local participant as the gaze information.

The face position tracing unit may generate coordinates relative to the camera or a predetermined reference point as the position information about the eyes or the face of the remote participant.

The face position tracing unit may generate a predetermined code as the position information about the eyes or the face of the remote participant when the eyes or the face of the remote participant is not included in the image on the screen of the display device.

The determining unit may determine to apply the eye-to-eye contact function when the local participant looks in a direction of a remote participant display region on the screen of the display device according to the gaze information about the local participant, and the eyes of the remote participant face a front side according to the position information about the eyes or the face of the remote participant.

The determining unit may determine not to apply the eye-to-eye contact function when the eyes of the remote participant do not face a front side according to the position information about the eyes or the face of the remote participant or the eyes or the face of the remote participant is not included in the image on the screen of the display device.

As described above, according to the apparatus and the method of controlling the eye-to-eye contact function of the teleconference system of the present invention, the teleconference system having the eye-to-eye contact function provides a natural eye-to-eye contact between a local participant and a remote participant by controlling the eye-to-eye contact function by using gaze information about the local participant and position information about the remote participant displayed on a screen, thereby improving absorption of teleconference participants.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like constituent elements are denoted by like reference numerals in the respective drawings. Further, a detailed description of already publicly known functions and/or configurations will be omitted. In contents disclosed below, parts necessary for understanding operations according to various exemplary embodiments will be mainly described, and descriptions of elements making a main point of the description obscured will be omitted. Further, some constituent elements of the drawings may be exaggerated, omitted, or schematically illustrated. An actual size is not totally reflected to a size of each constituent element, and thus contents described herein are not limited by relative sizes or intervals of constituent elements illustrated in the respective drawings.

Figure 2A:
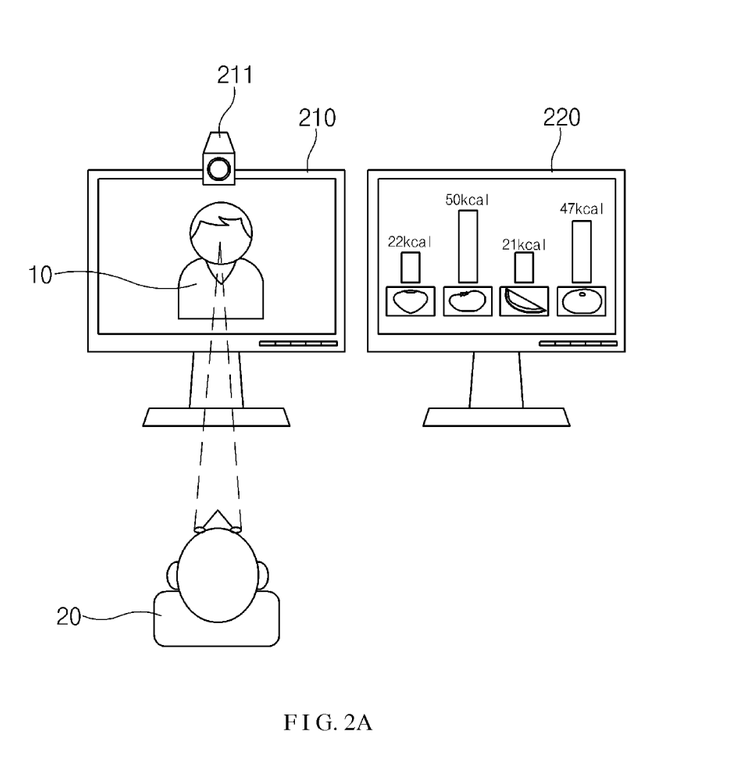
FIGS. 2A and 2B are diagrams for describing a concept of an eye-to-eye contact function between a remote participant and a local participant in a teleconference system according to an exemplary embodiment of the present invention.
Figure 2B:
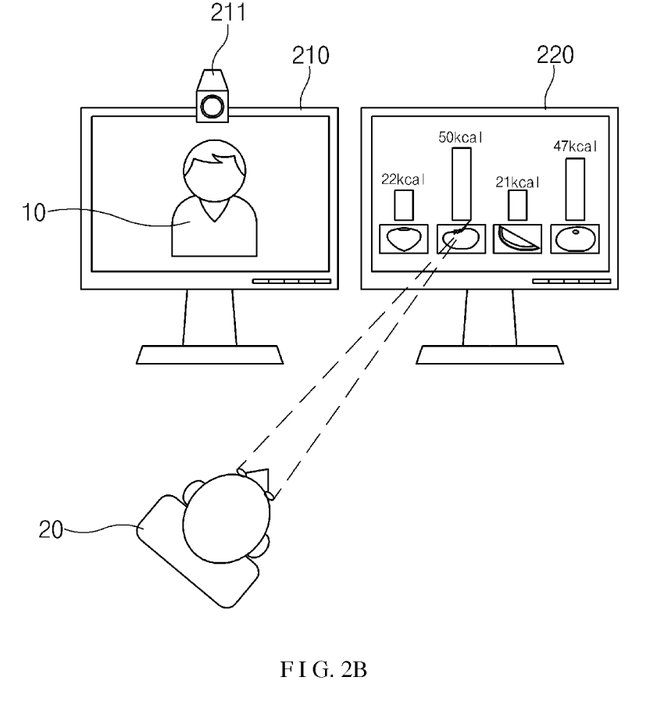

FIGS. 2A and 2B are diagrams for describing a concept of an eye-to-eye contact function between a remote participant 10 and a local participant 20 in a teleconference system according to an exemplary embodiment of the present invention.

As illustrated in FIGS. 2A and 2B, a teleconference system according to an exemplary embodiment of the present invention may include a display device 210, a camera 211, and a predetermined teleconference control device (not illustrated) for transceiving telepresence data exchanged, such as an image and voice data, during the teleconference. In addition, the teleconference system may further include an additional display device 220 to be used during a teleconference, and the additional display device 220 may also display a conference-related graph, video, image, reference materials during the teleconference, and may be used for displaying images of other remote participants in a teleconference of three or more participants depending on the case.

Hereinafter, the teleconference system according to the exemplary embodiment of the present invention will be described based on the aforementioned constituent elements provided at the local participant 20 side. However, the remote participant 10 side may include the display device, the camera, and the teleconference control device for transceiving telepresence data as the constituent elements of the teleconference system or a separate additional display device for displaying a reference material or an image of another participant, and be linked with the teleconference system of the local participant 20 side.

The teleconference system of the remote participant 10 and the teleconference system of the local participant 20 may be linked through a network, such as the Internet, a mobile communication network (WCDMA, LTE, and the like), LAN, and a Wi-Fi network.

First, as illustrated in FIG. 2A, the local participant 20 looks at the eye or a face of the remote participant 10 displayed on a screen of the display device 210 for a teleconference, but the camera 211 is located outside (for example, an upper side) the screen, so that when an image obtained by the camera 211 is transmitted as it is, the remote participant 10 feels that the local participant 20 is looking down, not the eyes or the face of the remote participant 10. In this case, in the present invention, a teleconference control apparatus transmits an image, in which the eyes of the local participant 20, which looks down, are adjusted to look at a front side by applying the eye-to-eye contact function to the image of the local participant 20 obtained through the camera 211 as described below, thereby making the remote participant 10 feel that the local participant 20 looks at the remote participant 10.

However, when the local participant 20 looks at another point, such as the separate additional display device 220, not in a direction of the remote participant 10 displayed on the display device 210 for a teleconference during the teleconference as illustrated in FIG. 2B, it is not necessary to apply the eye-to-eye contact function. In this case, when the eye-to-eye contact function is applied to the image of the local participant 20, there is a high possibility in that an unnatural image is rather combined. For example, when the eye-to-eye contact function, such as a replacement of only an eye part with an image, in which the eyes looks at the front side, is applied to an image of the local participant 20 obtained by the camera 211 in the environment as illustrated in FIG. 2B, an image, in which a direction of the face and an upper body of the local participant 20 is not consistent with a direction of the eyes of the local participant 20, is transmitted, so that the combined image is very unnatural.

Accordingly, the present invention aims to solve a conference absorption deterioration problem caused by an unnatural eye-to-eye contact combined image due to the unnecessary application of the eye-to-eye contact function by applying the eye-to-eye contact function when the local participant 20 looks at the eye or the face of the remote participant 10, and not applying the eye-to-eye contact function when the local participant 20 looks at another point, such as the separate additional display device 220, not the display device 210 for a teleconference.

That is, when the local participant 20 looks at the eyes or the face of the remote participant 10 displayed on the screen of the display device 210 for a teleconference as illustrated in FIG. 2A, the eye-to-eye contact function is applied, and when the local participant 20 looks at another point, such as the separate additional display device 220, not the face of the remote participant 10 on the screen of the display device 210 for a teleconference as illustrated in FIG. 2B, the eye-to-eye contact function is not applied.

To this end, the present invention determines whether to apply the eye-to-eye contact function by considering the eyes of the local participant 20 and a position of the face of the remote participant 10 displayed on the display device 210 for a teleconference. Further, it is possible to improve performance of the eye-to-eye contact function by using information on the eyes of the local participant 20 and the position of the face of the remote participant 10 on the screen when the eye-to-eye contact function is applied.

Figure 3:
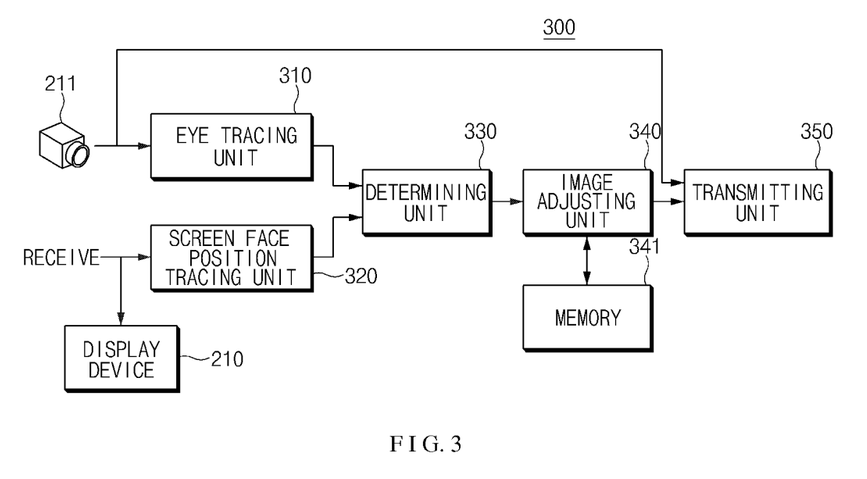
FIG. 3 is a diagram for describing an eye-to-eye contact function control apparatus of a teleconference system according to an exemplary embodiment of the present invention.

FIG. 3 is a diagram for describing a teleconference control apparatus 300 for controlling the eye-to-eye contact function of a teleconference system according to an exemplary embodiment of the present invention.

Referring to FIG. 3, the teleconference control apparatus 300 of the teleconference system according to the exemplary embodiment of the present invention includes an eye tracing unit 310 linked with the camera 211, a screen face position tracing unit 320 for receiving telepresence data from a teleconference system of the remote participant 10 and tracing a position of the eyes or the face of the remote participant 10, a determining unit 330 for determining whether to apply the eye-to-eye contact function, an image adjusting unit 340 for adjusting an image for an eye-to-eye contact by using data stored in the memory 341, and a transmitting unit 350 for transmitting the telepresence data to the teleconference system of the remote participant 10. The telepresence data received from the teleconference system of the remote participant 10 is processed by the display device 210, so that the remote participant 10 is displayed on the screen as illustrated in FIG. 2.

Constituent elements of each part of the teleconference control apparatus 300 of the teleconference system according to the exemplary embodiment of the present invention may be implemented by hardware, software, or a combination thereof. For example, necessary setting or data may be provided to the constituent elements of each part of the teleconference control apparatus 300 necessary for controlling the eye-to-eye contact function of the present invention by executing a predetermined application program stored in the memory 341. Further, the entire or a part of the constituent elements of each part of the teleconference control apparatus 300 may also be implemented by one processor.

Figure 4:
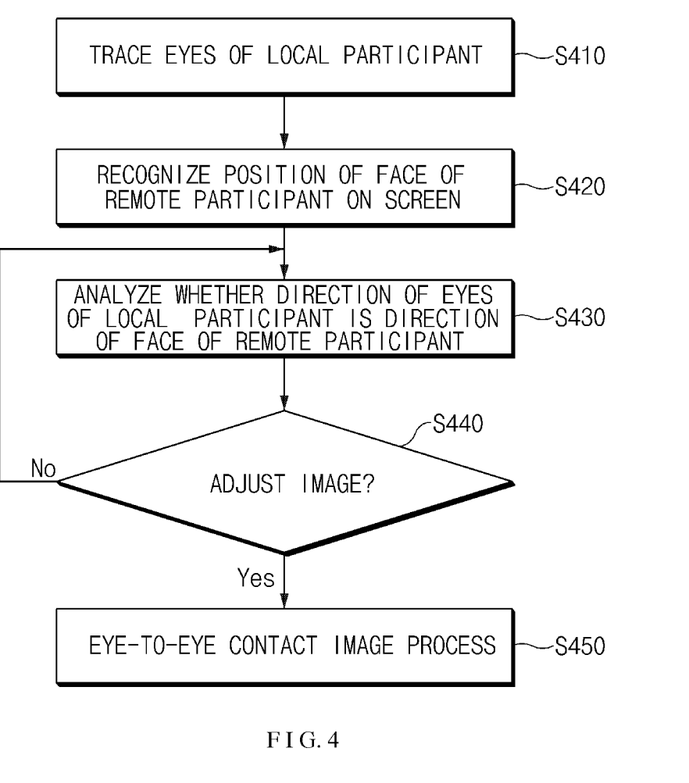
FIG. 4 is a flowchart for describing an eye-to-eye contact function control method of a teleconference system according to an exemplary embodiment of the present invention.

Hereinafter, an eye-to-eye contact function control method by using the teleconference control apparatus 300 of the teleconference system according to the exemplary embodiment of the present invention will be described in detail with reference to FIG. 4.

The eye tracing unit 310 traces the eyes of the local participant 20 from an image obtained by the camera 211 including an image of the local participant 20 and generates gaze information about the local participant 20 for every predetermined period (for example, 1 msec) in real time (S410). To this end, position information (for example, coordinates (X, Y, Z) with respect to a predetermined reference point) about the camera 211 may be pre-stored in the memory 341 and used, and further, in order to display an image including the eyes or the face of the remote participant 10 on a region of the entire screen or the screen of the display device 210 relative to the position information about the camera 211, data for a predetermined region (hereinafter, referred to as a remote participant display region) may be stored in the memory 341 and the like and used. The eye tracing unit 310 may analyze the image obtained by the camera 211, extract a direction, in which the eyes (in addition, a direction of hair, a forehead, a nose, a lip, a cheek, or an ear may be further referred) of the local participant 20 face (for example, based on each image when the local participant 20 looks at the camera or a front side, a direction may be extracted from an image compared with each image), and generate information, that is, gaze information, indicating whether the eyes of the local participant 20 face the remote participant display region. For example, the gaze information may be logical high information when the eyes of the local participant 20 face the remote participant display region, and be logic low information in other cases. Depending on a case, the gaze information may be information indicating a direction of the remote participant display region or a direction among up, down, left, and right directions of the remote participant display region in which the eyes of the local participant 20 face on the screen of the display device, or information indicating an actual eye direction (for example, a direction vector (X, Y, Z) with respect to a predetermined reference point) with respect to a predetermined reference point (the position information about the camera 211 may be the reference point).

When a predetermined receiving unit receives telepresence data from the teleconference system of the remote participant 10 through a network, the face position tracing unit 320 traces the position of the eyes or the face of the remote participant 10 displayed on the screen of the display device 210 for a teleconference from the received telepresence data for every predetermined period (for example, 1 msec) in real time, and generates position information about the eyes or the face of the remote participant 10 on the screen (S420). In this case, the remote participant 10 may step out for a while or the eyes of the remote participant 10 may face another point, instead of the front side (the direction of the local participant), in order to explain other materials during the teleconference, the face position tracing unit 320 may determine this situation. For example, the face position tracing unit 320 may calculate relative coordinates (X, Y, Z) with respect to the predetermined reference point or coordinates (X, Y, Z) relative to the position information about the camera 211 as the information on the position of the eyes or the face of the remote participant 10 in the remote participant display region on the screen of the display device 210. When the eyes or the face of the remote participant 10 is not included in the image, the face position tracing unit 320 may output a predetermined code as corresponding information.

The determining unit 330 analyzes the eyes and the like of the local participant 20 based on the gaze information about the local participant 20 generated by the eye tracing unit 310 and the position information about the eyes or the face of the remote participant 10 on the screen generated by the face position tracing unit 320 (S430), and determines whether to adjust the image by applying the eye-to-eye contact function to the image obtained by the camera 211 including the image of the local participant 20 (S440). For example, when the local participant 20 looks at the eyes or the face of the remote participant 10 (or the direction of the remote participant display region) on the screen (for example, including the case where the local participant 20 looks at the remote participant display region or an up, down, left, or right side of the remote participant display region within a predetermined distance) according to the gaze information about the local participant 20, and the eyes of the remote participant 10 face the front side according to the position information about the eyes or the face of the remote participant 10 on the screen, it is determined to apply the eye-to-eye contact function. Further, when the local participant 20 looks at another point, such as the separate additional display device 220, not the display device 210, for a teleconference, the eye-to-eye contact function is not applied, thereby solving a conference absorption degradation problem caused by the unnatural image generated by an unnecessary application of the eye-to-eye contact function. In addition, even when the eyes of the remote participant 10 do not face the front side according to the position information about the eyes or the face of the remote participant 10 on the screen, or the eyes or the face of the remote participant 10 is not included in the image, the determining unit 330 may determine not to apply the eye-to-eye contact function.

When the determining unit 330 determines to apply the eye-to-eye contact function, the image adjusting unit 340 adjusts the image obtained by the camera 211 including the image of the local participant 20 so that the eyes of the local participant 20 face the eyes or the face of the remote participant 10 (S450). The image adjusting unit 340 may generate the image, in which the eye-to-eye contact is made, so that the remote participant 10 feels that the local participant 20 looks at the eyes or the face of the remote participant 10 while looking at the corresponding image by adjusting or combining the eye part of the local participant 20 or adjusting or combining the face part of the local participant 20 in the image obtained by the camera 211 by various image adjusting methods or image combining methods.

Depending on the case, for example, the image adjusting unit 340 may perform an image combination of replacing the eye part of the remote participant 10 with an eye image, in which the remote participant 10 looks forward (the direction of the remote participant) or at the front side. To this end, the image adjusting unit 340 may extract the eye part when the local participant 20 looks forward or at the front side from the image obtained by the camera 211 in advance during the ongoing teleconference and store corresponding data in the memory 341, and use the stored data when combining the image. Depending on the case, eye image data of the local participant 20, in which the local participant 20 looks forward or at the front side, may be stored in the memory 341 in advance before the teleconference, and further, another eye image (for example, a digital animation image) data, in which eyes (not the actual eyes of the local participant 20) look forward or at the front side, may be stored in the memory 341 in advance and used.

The transmitting unit 350 transmits the telepresence data including the image obtained by the camera 211 including the image of the local participant 20 to the teleconference system of the remote participant 10, and when the determining unit 330 determines to apply the eye-to-eye contact function, the transmitting unit 350 transmits the telepresence data including the image adjusted and generated by the image adjusting unit 340 to the teleconference system of the remote participant 10. Although not illustrated, the teleconference system may include a microphone for generating a voice signal of the remote participant 10, and corresponding voice data for a voice input into the microphone by the remote participant 10 may be reflected to and included in the telepresence data in real time.

During the teleconference, the position of the eyes or the face of the remote participant 10 displayed on the screen may be varied according to a movement of the remote participant 10, and the eyes of the remote participant 10 may be varied according to the movement of the local participant 20. Accordingly, a parameter necessary to the eye-to-eye contact is more finely estimated by using the gaze information about the local participant 20 and the position information about the eyes or the face of the remote participant 10 on the screen together with the position information about the camera 211 when the eye-to-eye contact function is applied similar to the present invention, thereby improving performance of the eye-to-eye contact function.

As described above, the present invention has been described based on the specified matters, such as the particular constituent elements, the limited exemplary embodiments, and the drawings, but the specified matters, such as the particular constituent elements, the limited exemplary embodiments, and the drawings are provided to help general understanding of the present invention, and the present invention is not limited by the exemplary embodiment. Those skilled in the art may variously correct and modify the present invention within a range without departing from the essential characteristic of the present invention. Accordingly, the spirit of the present invention should not be limited and defined by the aforementioned exemplary embodiment, and it should be construed that all of the technical spirits of the claims and an equivalent to the claims or an equivalent modification are included in the scope of the present invention.

What is claimed is:

1. A method of controlling a teleconference for controlling an eye-to-eye contact function of a teleconference system, comprising:
   generating gaze information about a local participant from an image obtained by a camera in real time;
   generating positon information about eyes or a face of a remote participant displayed on a screen of a display device for a teleconference from telepresence data received from a teleconference system of the remote participant through a network in real time; and
   determining whether to apply an eye-to-eye contact function to the image obtained by the camera by using the gaze information about the local participant and the position information about the eyes or the face of the remote participant,
   wherein the eye-to-eye contact function is not applied when the local participant looks at a point away from the remote participant, using eye tracing for the local participant and the remote participant,
   wherein the generating of the position information about the eyes or the face of the remote participant includes generating coordinates relative to the camera or a predetermined reference point as the position information about the eyes or the face of the remote participant, and
   wherein the determining whether to apply the eye-to-eye contact function includes determining to apply the eye-to-eye contact function when the local participant looks in a direction of a remote participant display region on the screen of the display device according to the gaze information about the local participant, and the eyes of the remote participant face a front side according to the position information about the eyes or the face of the remote participant.

2. The method of claim 1, further comprising:
   adjusting the image obtained by the camera so that the eyes of the local participant in the image obtained by the camera face the eyes or the face of the remote participant according to the determining whether to apply the eye-to-eye contact function.

3. The method of claim 2, further comprising:
   transmitting telepresence data including the adjusted image generated through the adjustment of the image to the teleconference system of the remote participant.

4. The method of claim 1, wherein the generating of the gaze information about the local participant includes generating information indicating whether the eyes of the local participant face a remote participant display area on the screen of the display device as the gaze information.

5. The method of claim 1, wherein the generating of the gaze information about the local participant includes generating information indicating a direction of a remote participant display region or a direction among up, down, left, and right directions of the remote participant display region in which the eyes of the local participant face on the screen of the display device, or the information about an actual eye direction of the local participant as the gaze information.

6. The method of claim 1, wherein the generating of the position information about the eyes or the face of the remote participant includes generating a predetermined code as the position information about the eyes or the face of the remote participant when the eyes or the face of the remote participant is not included in the image on the screen of the display device.

7. The method of claim 1, wherein the determining whether to apply the eye-to-eye contact function includes determining not to apply the eye-to-eye contact function when the eyes of the remote participant do not face a front side according to the position information about the eyes or the face of the remote participant or the eyes or the face of the remote participant is not included in the image on the screen of the display device.

8. An apparatus for controlling a teleconference for controlling an eye-to-eye contact function of a teleconference system, comprising:
   an eye tracing unit configured to generate gaze information about a local participant from an image obtained by a camera in real time;
   a face position tracing unit configured to generate positon information about eyes or a face of a remote participant displayed on a screen of a display device for a teleconference from telepresence data received from a teleconference system of the remote participant through a network in real time; and
   a determining unit configured to determine whether to apply an eye-to-eye contact function to the image obtained by the camera by using the gaze information about the local participant and the position information about the eyes or the face of the remote participant,
   wherein the eye-to-eye contact function is not applied when the local participant looks at a point away from the remote participant, using eye tracing for the local participant and the remote participant,
   wherein the face position tracing unit generates coordinates relative to the camera or a predetermined reference point as the position information about the eyes or the face of the remote participant, and wherein the determining unit determines to apply the eye-to-eye contact function when the local participant looks in a direction of a remote participant display region on the screen of the display device according to the gaze information about the local participant, and the eyes of the remote participant face a front side according to the position information about the eyes or the face of the remote participant.

9. The apparatus of claim 8, further comprising:
an image adjusting unit configured to adjust the image obtained by the camera so that the eyes of the local participant in the image obtained by the camera look at the eyes or the face of the remote participant according to the determination of the determining unit.

10. The apparatus of claim 9, further comprising:
a transmitting unit configured to transmit telepresence data including the image adjusted and generated by the image adjusting unit to the teleconference system of the remote participant.

11. The apparatus of claim 8, wherein the eye tracing unit generates information indicating whether the eyes of the local participant face a remote participant display area on the screen of the display device as the gaze information.

12. The apparatus of claim 8, wherein the eye tracing unit generates information indicating a direction of a remote participant display region or a direction among up, down, left, and right directions of the remote participant display region in which the eyes of the local participant face on the screen of the display device, or the information about an actual eye direction of the local participant as the gaze information.

13. The apparatus of claim 8, wherein the face position tracing unit generates a predetermined code as the position information about the eyes or the face of the remote participant when the eyes or the face of the remote participant is not included in the image on the screen of the display device.

14. The apparatus of claim 8, wherein the determining unit determines not to apply the eye-to-eye contact function when the eyes of the remote participant do not face a front side according to the position information about the eyes or the face of the remote participant or the eyes or the face of the remote participant is not included in the image on the screen of the display device.

* * * * *